W. P. LOUDON.
VALVE OPERATING MECHANISM.
APPLICATION FILED MAR. 25, 1918.

1,350,077.

Patented Aug. 17, 1920.

WITNESS:

INVENTOR.
Warren P. Loudon
BY

ATTORNEY.

UNITED STATES PATENT OFFICE.

WARREN P. LOUDON, OF NIAGARA FALLS, NEW YORK, ASSIGNOR TO VAPOR CAR HEATING COMPANY, INC., OF CHICAGO, ILLINOIS, A CORPORATION OF NEW YORK.

VALVE-OPERATING MECHANISM.

1,350,077.  Specification of Letters Patent.  Patented Aug. 17, 1920.

Application filed March 25, 1918. Serial No. 224,449.

*To all whom it may concern:*

Be it known that I, WARREN P. LOUDON, a citizen of the United States, residing at Niagara Falls, in the county of Niagara and State of New York, have invented new and useful Improvements in Valve-Operating Mechanism, of which the following is a specification.

The present invention relates to valve operating mechanism.

In certain systems, as for instance the automatically controlled steam heating systems of railway cars, it is desirable to provide motor means for operating the radiator valves, which motor means may be controlled at a remote point to open or close said valves. Inasmuch as the space around the radiator valves in a steam heating system of railway cars is very limited in which mechanical means may be installed to operate the valves, it has been considered impractical to install electric motors large enough to have the necessary torque to impart movement to the valves.

An object of the present invention is to provide a novel valve operating mechanism comprising an electric motor which surrounds the stem of the valve in such a way as to occupy a minimum of space and to further provide a suitable operating connection between said motor and valve stem which will be compact in structure, inexpensive to manufacture and effective in its operation, whereby a small motor of low torque may be expeditiously used in the provision of a relatively small, mechanically operated mechanism suitable for the above purpose.

A further object is to provide a valve operating mechanism which may be either manually or motor operated, as desired.

Further objects will appear as the description proceeds.

Figure 2:
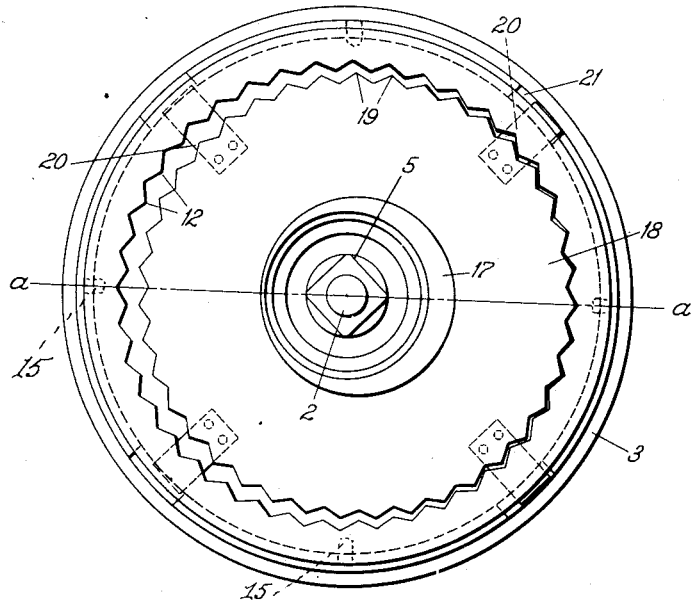
Fig. 2 is a plan view with the cover removed.
Figure 1:
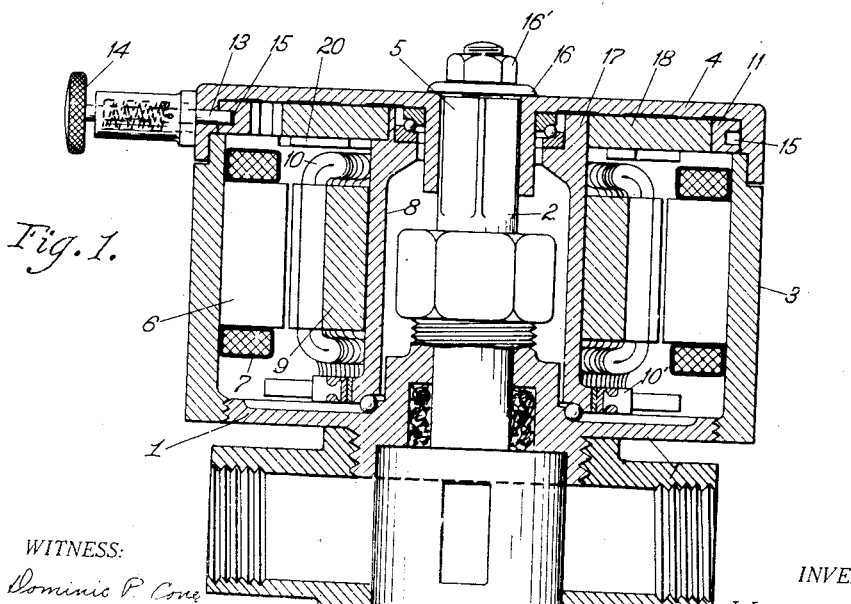
Figure 1 represents one embodiment of the present invention. Said figure is a sectional elevation taken along the line *a—a* of Fig. 2.

The numeral 1 represents a radiator valve structure of the type in which the rotation of its stem 2 in one direction will close the valve, and its rotation in the opposite direction will open the valve.

Surrounding the stem 2 is a motor casing 3 provided with a cover portion 4. The casing 3 may be securely mounted, as by screw threads upon a portion of the valve structure 1.

The cover 4 is adapted to have a movement of rotation relative to the casing 3 and is secured to the stem 2 of the valve. The stem 2 may be provided with flat faces 5, 5, upon which cover member 4 will fit, whereby the cover member 4 and the stem 2 may move as one member. Carried by the casing 3 is a magnetic field 6 carrying the field winding 7. Within the field yoke 6 and surrounding the valve stem 2 is an armature supporting member 8. The armature supporting member 8 may be mounted to rotate relative to the member 1, being supported by the member 1 and the cover 4. Suitable ball-bearings may be provided whereby friction will be reduced to a minimum. The armature supporting member 8 carries an armature 9 which is provided with armature windings 10. The commutator is indicated by the numeral 10'. It will be clear that when the field magnet 6 and armature 9 are energized from a source of current, the armature 9 will be rotated, whereby to carry with it the armature supporting member 8. It will be obvious, of course, that field and armature windings may be reversed, whereby the stationary magnet will be the armature and the rotating magnet will be the field.

The cover 4 has mounted therein a spur gear 11 with internally projecting teeth 12, 12. Said spur gear 11 is adapted to ride upon the upper edge of the casing 3. The spur gear 11 may be locked to the cover 4 by means of the pin 13. Said pin 13, which extends through the cover 4 and is provided with a head 14, may rest within one of a plurality of holes 15 arranged around the periphery of the spur gear 11. The pin 13 will be spring-pressed inwardly, whereby, when said pin 13 is located within one of the holes 15, the cover 4 and spur gear 11 will be locked together. Said members may be unlocked, however, by withdrawing the pin 13 from the hole 15, under which conditions the cover 4 may be rotated by hand independently of the gear 11. A washer 16 and nut 16' may be provided on the stem 2 for holding the cover 4.

That part of the member 8 which supports the armature 9 should be so formed as to cause the armature 9 to have a movement of rotation about an axis which is substantially coincident with the axis of the stem 2. The upper end of the member 8 should be formed to provide an eccentric. The upper portion of the member 8 may be cylindrical in outline but it should have its center displaced from the axis of the stem 2, whereby the upper portion of the member 8 will operate as an eccentric or cam, indicated by the numeral 17. Mounted upon the cam 17 is an internal eccentric gear 18 which is provided with teeth 19, 19. The gear 18 is adapted to mesh with the spur gear 11 and should preferably have one less tooth than said spur gear. The internal eccentric gear 18 is provided with a plurality of radially extending fins or supporting members 20, 20. Said fins 20 rest above the upper edge of the casing 3 and are adapted to have a rocking movement within slots 21, 21.

It will be evident that when the field magnet 6 and armature 9 are energized, rotation of the armature 9 will be produced. Whether said rotation shall be in a direction to open or close the valve will, of course, depend upon the relative polarities of the field and armature. Rotation of the armature 9 will operate through the supporting member 8 to rotate the cam 17. The rotation of cam 17 will result in an eccentric movement of the internal gear 18, which will operate in a manner well understood to rotate the spur gear 11. Inasmuch as the spur gear 11 will normally be locked to the cover member 4 by means of the pin 13, rotation of the spur gear 11 will result in the turning of the valve stem 2. Reversal in the direction of the armature 9 will, of course, result in the reversal of the direction of rotation of the spur gear 11 and valve stem 2. Movement of the valve stem 2 may thereby be controlled at a remote point.

Should it be desired to operate the valve stem 2 independently of the motor mechanism, the pin 13 may be withdrawn by means of the head 14 whereby the cover 4 may rotate independently of the spur gear 11. The cover 4 may then be rotated as desired.

One embodiment of the present invention has been described in detail. Many modifications will occur to those skilled in the art. It is intended in this patent to cover all such modifications that fall within the scope of the invention as defined by the appended claims.

What I claim as new and desire to secure by Letters Patent of the United States, is—

1. In a valve operating mechanism of the character described, the combination with a rotary valve having a stem projecting therefrom, of an electric motor surrounding said valve stem and arranged co-axially therewith, and means providing an operative engagement between said motor and valve stem comprising a cam operated by the motor, a gear eccentrically supported with relation to the axis of said motor and operated by said cam, and a gear connected with said valve stem and meshing with the first mentioned gear.

2. In a valve operating mechanism of the character described, the combination with a rotary valve having a stem projecting therefrom, of an electric motor surrounding said valve stem and arranged co-axially therewith, and means providing an operative connection between said motor and valve stem comprising a cam operated by the motor, a gear eccentrically supported with relation to the axis of said motor and operated by said cam, and a gear readily connected with or disconnected from said valve stem manually and meshing with the first mentioned gear.

3. In a valve operating mechanism of the character described, the combination with a rotary valve having a stem projecting therefrom, of an electric motor comprising a casing, a stator supported by said casing and a rotor all of which surround said valve stem, and means providing an operating connection between said motor and valve stem comprising a gear eccentrically supported with relation to the axis of said motor, a cam for operating said gear and a gear arranged concentric with relation to the action of said valve stem and formed with internal teeth which mesh with the teeth of the first mentioned gear.

4. In a valve operating mechanism of the character described, the combination with a rotary valve having a stem projecting therefrom, of an electric motor comprising a casing, a stator supported by said casing and a rotor all of which surround said valve stem, and means providing an operative connection between said motor and valve stem comprising a gear eccentrically supported with relation to the axis of said motor, rotor supporting means provided with a cam for operating said gear and a gear arranged concentric with relation to the axis of said valve stem and formed with internal teeth which mesh with the teeth of the first mentioned gear.

5. In a valve operating mechanism of the character described, in combination with a rotary valve having stem projecting therefrom, of an electric motor comprising a casing, a stator supported by said casing and a rotor all of which surround said valve stem, and means providing an operative connection between said motor and valve stem comprising a gear eccentrically supported with relation to the axis of said motor, rotor supporting means provided with a cam for operating said gear and a gear arranged concentric with relation to the axis of said valve stem and formed with internal teeth which mesh with the teeth of the first mentioned gear, a cover member for said motor casing fixed to the valve stem, and manually operable catch means for selectively connecting said cover rigidly with said concentrically disposed gear or to permit said cover to move independently thereof.

In witness whereof, I have hereunto subscribed my name.

WARREN P. LOUDON.